(12) United States Patent  (10) Patent No.: US 7,630,129 B2
Kawanabe et al.  (45) Date of Patent: Dec. 8, 2009

(54) EXAMINATION APPARATUS

(75) Inventors: Hideyuki Kawanabe, Hino (JP); Chika Nakajima, Chofu (JP)

(73) Assignee: Olympus Corporation, Tokyo (JP)

( * ) Notice: Subject to any disclaimer, the term of this patent is extended or adjusted under 35 U.S.C. 154(b) by 336 days.

(21) Appl. No.: 11/541,631

(22) Filed: Oct. 3, 2006

(65) Prior Publication Data

US 2007/0081237 A1  Apr. 12, 2007

(30) Foreign Application Priority Data

Oct. 6, 2005 (JP) ............................. 2005-294057

(51) Int. Cl.
 *G02B 21/26* (2006.01)
(52) U.S. Cl. .................... 359/393; 359/391; 359/398
(58) Field of Classification Search .................. 359/391, 359/393, 396, 398
See application file for complete search history.

(56) References Cited

U.S. PATENT DOCUMENTS 4,501,495 A * 2/1985 Faulkner et al. ............. 356/244
5,578,821 A  11/1996 Meisberger et al.
2005/0282268 A1* 12/2005 Kagayama ............... 435/288.7
2006/0050376 A1* 3/2006 Houston et al. .............. 359/392

FOREIGN PATENT DOCUMENTS

| EP | 1 139 385 A2 | 10/2001 |
| EP | 1 304 717 A1 | 4/2003 |
| JP | 2004-021006 | 1/2004 |
| WO | WO 01/04611 A2 | 1/2001 |

* cited by examiner

*Primary Examiner*—Joshua L Pritchett
(74) *Attorney, Agent, or Firm*—Pillsbury Winthrop Shaw Pittman, LLP

(57) ABSTRACT

An examination apparatus that has a simple structure and that is capable of determining the condition inside the apparatus and improving the ease of use of the apparatus when a specimen is changed is provided. The examination apparatus includes a stage on which a specimen is disposed; an optical system configured to form an enlarged or reduced image of the specimen; a cover configured to cover the stage and the optical system; an opening and closing member provided as part of the cover; a detection unit configured to detect whether the opening and closing member is in a closed state or an open state; and a stage driving unit configured to move the state. Only when the detection unit detects that the opening and closing member is open, the stage is moved by the stage driving unit to the outside of the cover through an opening covered by the opening and closing member.

1 Claim, 18 Drawing Sheets

|  | DOOR OPEN | DOOR CLOSED |
|---|---|---|
| X-DIRECTION MOVEMENT RANGE | 0-60000 | 0-60000 |
| Y-DIRECTION MOVEMENT RANGE | 0-150000 | 0-70000 |

※UNITS FOR MOVEMENT RANGE: MOTOR DRIVING PULSE NUMBER
(POSITION ADDRESS)

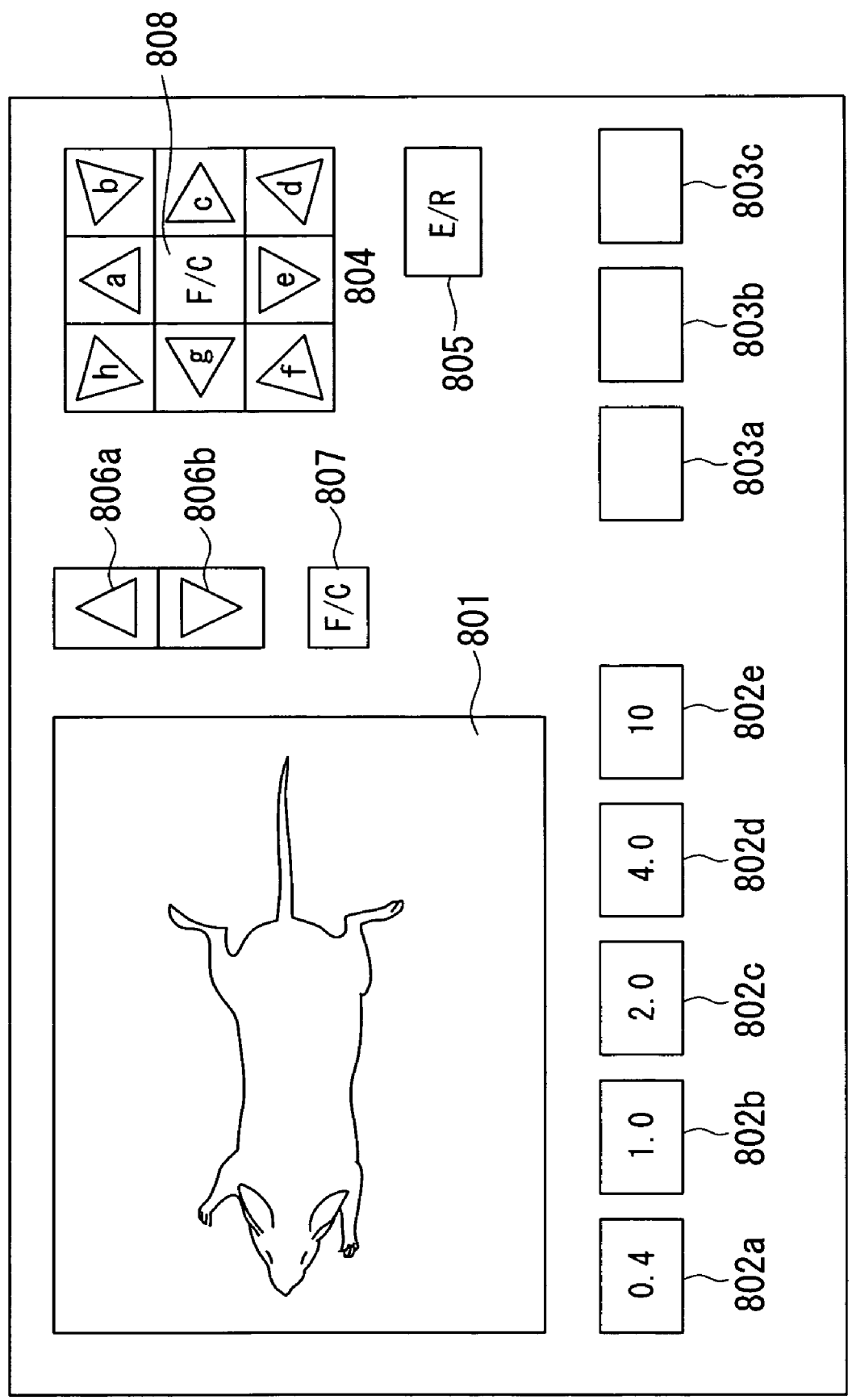

EXAMINATION APPARATUS

BACKGROUND OF THE INVENTION

1. Field of the Invention

The present invention relates to an examination apparatus configured to display an enlarged or reduced image of a specimen and, more specifically, relates to an examination apparatus having a sealed box-shaped enclosure containing a space for disposing a specimen and an examination optical system.

This application is based on Japanese Patent Application No. 2005-294057, the content of which is incorporated herein by reference.

2. Description of Related Art

For an examination apparatus having a box-shaped enclosure accommodating a specimen and various essential components, such as an optical unit including objective lenses and a camera for capturing an observation image, an access door provided on a part of the box-shaped enclosure is opened and a specimen is manually disposed on a stage inside the box-shaped enclosure when the specimen is to be changed or when a new specimen is to be disposed.

In addition, a microscope apparatus allowing specimens to be changed easily has been proposed.

For example, the microscope apparatus disclosed in Japanese Unexamined Patent Application Publication No. 2004-21006 has a specimen tray that automatically moves outside the apparatus by a one-touch operation. After a specimen is placed on the tray, the tray can be returned inside the apparatus by a one-touch operation. Therefore, the user can continue their examination without being disturbed by the process of changing the specimen.

However, the microscope apparatus disclosed in Japanese Unexamined Patent Application Publication No. 2004-21006 is provided essentially for small specimens, such as prepared slides. When the concept of this invention is applied to an examination apparatus used for examining small animals, such as mice, the size of the tray has to be increased. Moreover, the size of the apparatus is increased because the XYZ driving range of the stage is increased. When the stage is driven, the tray is moved outside the apparatus from a slit provided in the box-shaped enclosure. Since the location of the slit cannot be changed, depending on the orientation of the microscope apparatus, the tray may project from the slit in a position that makes it difficult for the user to operate the apparatus. When a live specimen is to be examined, the user must check whether or not the condition of the specimen has changed during examination. However, for an apparatus that has a cover over the slit from which the tray is projected, the condition inside the apparatus cannot be observed during examination.

BRIEF SUMMARY OF THE INVENTION

The present invention has been conceived in light of the problems described above. Accordingly, it is an object of the present invention to provide an examination apparatus that has a simple structure and that is capable of determining the condition inside the apparatus and improving the ease of use of the apparatus when specimens are changed.

To achieve the above-described object, the present invention provides the following solutions.

The present invention provides an examination apparatus including a stage on which a specimen is disposed; an optical system configured to form an enlarged and reduced image of the specimen; a cover configured to cover the stage and the optical system; an opening and closing member provided as part of the cover; a detection unit configured to detect whether the opening and closing member is in a closed state or an open state; and a stage driving unit configured to move the stage. Only when the detection unit detects that the opening and closing member is open, the stage is moved by the stage driving unit to the outside of the cover through an opening covered by the opening and closing member.

According to the present invention, the stage driving unit may carry out an eject movement in which the stage is carried out from the inside of the cover to a first predetermined position outside the opening and may a return movement in which the stage is carried in from the outside of the opening to a second predetermined position inside the cover.

According to the present invention, the examination apparatus may further include a storage unit configured to store at least an eject position of the stage, and, when carrying the stage out to outside the cover, the stage may be carried out to the eject position stored in the storage unit.

According to the present invention, the examination apparatus may further include a storage unit configured to store at least a return position of the stage, and, when carrying the stage in to inside the cover, the stage is carried in to the return position stored in the storage unit.

According to the present invention, the examination apparatus may further include an anesthetic apparatus configured to anesthetize the specimen; a tube configured to supply anesthetic from the anesthetic apparatus to the specimen; an attachment member configured to attach the tube to the stage; and a holding member configured to hold the tube interposed between the attachment member and the anesthetic apparatus. The tube may be easily held by the holding member even when the eject movement and the return movement of the stage is being carried out.

According to the present invention, the holding member may be a rotary wind-up mechanism.

According to the present invention, in the examination apparatus according to an embodiment of the present invention, a specimen is disposed in a sealed space and is examined from the outside, and access to the inside of the apparatus is restricted by an access door. The movement range of an XY stage holding the specimen is extended outside an opening that can be left open or covered in the exterior of the apparatus. By automatically moving the XY stage to outside the opening, the user can easily change the specimen, dispose a new specimen, and treat the specimen. Since the XY stage can be quickly returned to the examination position, various different specimens can be examined quickly and easily.

BRIEF DESCRIPTION OF THE SEVERAL VIEWS OF THE DRAWINGS

FIG. 6 illustrates a graphical user interface (GUI) of a control application of the examination apparatus illustrated in FIG. 1.

DETAILED DESCRIPTION OF THE INVENTION

An examination apparatus according to a first embodiment of the present invention will be described below with reference to FIGS. 1 to 8.

Figure 1:
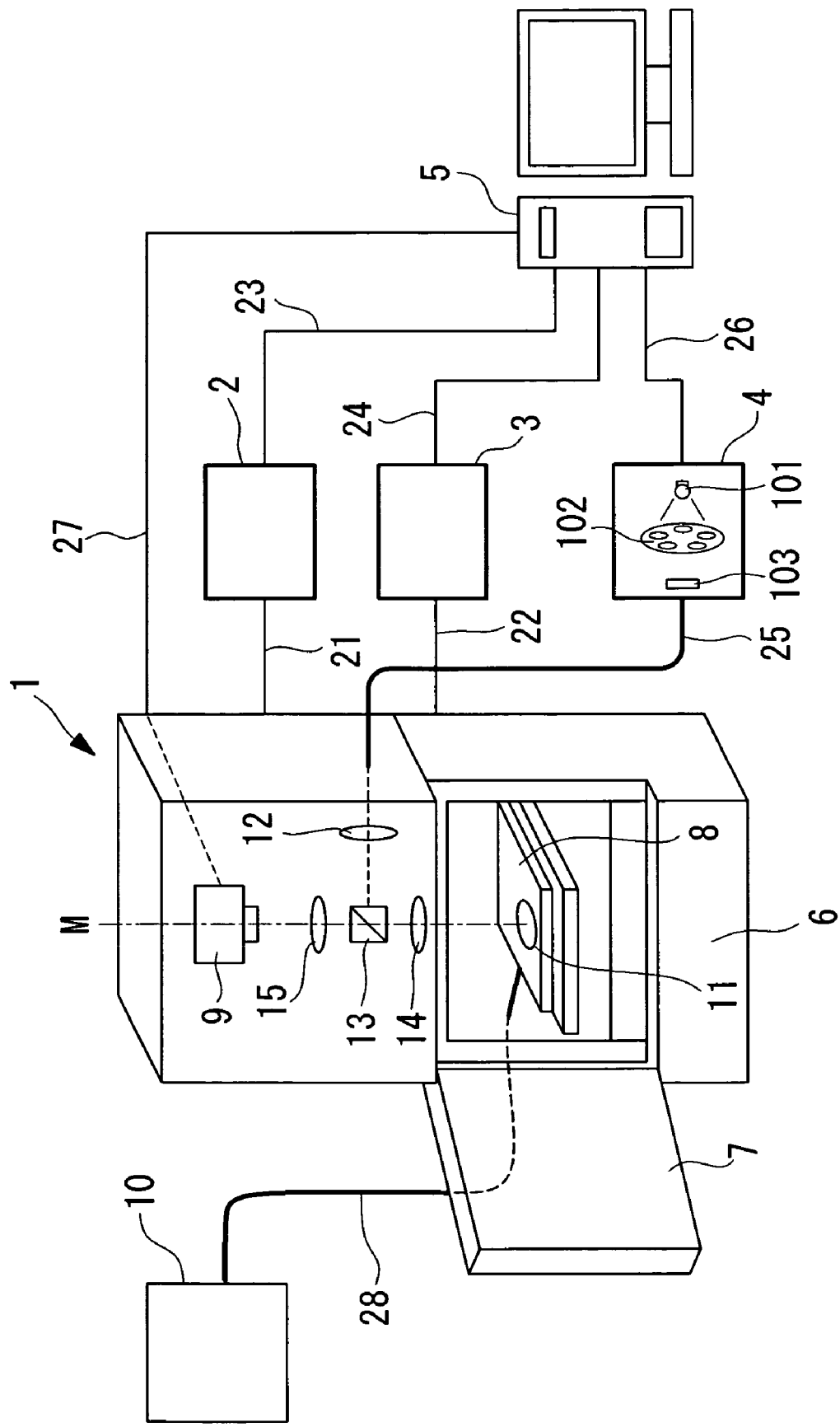
FIG. 1 illustrates the overall structure of an examination apparatus according to a first embodiment of the present invention.

As shown in FIG. 1, the examination apparatus according to this embodiment includes an examination apparatus main body 1, a system controller 2, and a stage controller 3 that are connected to the examination apparatus main body 1 via cables 21 and 22, respectively, and a computer 5 that is connected to the system controller 2 and the stage controller 3 via RS232 cables 23 and 24, respectively.

The examination apparatus includes an illumination device 4 configured to supply illumination light through an optical fiber 25. The illumination device 4 includes a lamp 101 that is the light source, excitation filters 102 that transmit only light having a wavelength within a predetermined wavelength band, and a shutter 103 for blocking the illumination light. One of the excitation filters 102 can be disposed on the optical axis. The illumination device 4 is connected to the computer 5 via a LAN cable 26 and can be controlled by the computer 5. A digital camera 9 including a charge-coupled device (CCD) is disposed inside the examination apparatus main body 1 as an examination-image capturing unit. The digital camera 9 is connected to the computer 5 via a cable 27.

The examination apparatus main body 1 is entirely covered with an exterior case 6 so as to shut out light (i.e., outside light). The exterior case 6 has an access door 7. By opening the access door 7, the area inside the examination apparatus main body 1 and an XY stage 8 disposed therein can be accessed. On the XY stage 8, a specimen 11 to be examined is disposed. The XY stage 8 is driven by the system controller 2 in the vertical direction for focusing and is driven by the stage controller 3 in a plane parallel to the stage surface.

Excitation light from the illumination device 4 guided through the optical fiber 25 into the examination apparatus main body 1 is collimated by a lens group 12. The collimated excitation light is reflected downward along the optical axis M by a cube 13. The cube 13 includes a typical dichroic mirror. The excitation light reflected downward is focused by an objective lens 14 and is incident on the specimen 11. Fluorescence is generated when the excitation light is incident on the specimen 11. An imaging lens 15 forms a fluorescent image on the CCD surface of the digital camera 9 through the objective lens 14 and the cube 13. In this way, the fluorescence image of the specimen 11 formed on the CCD surface is shown on the display of the computer 5.

A plurality of cubes 13 is provided on a rotary turret (not shown in the drawings), and one of these cubes 13 is selectively disposed in the optical path. Similarly, a plurality of objective lenses 14 is provided on a rotary mechanism (not, shown), and one of these objective lenses 14 is selectively disposed in the optical path. The rotary turret for the cubes 13 and the rotary mechanism for the objective lenses 14 are controlled by the system controller 2. An anesthetic apparatus 10 supplies anesthetic gas, which is a gaseous form of liquid anesthetic, to the specimen 11 through an anesthetic tube 28.

The access door 7 and the area around the access door 7 will be described with reference to FIGS. 2A to 2D.

Figure 2A:
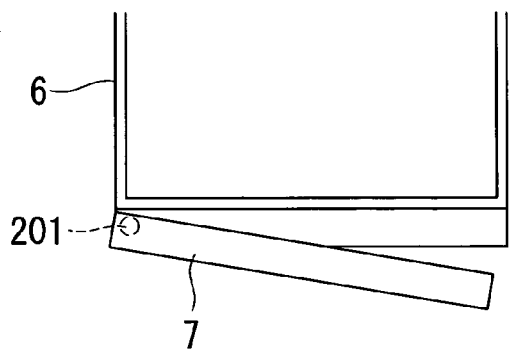
FIGS. 2A to 2D illustrate the structure of an access door and the area therearound of the examination apparatus shown in FIG. 1.
Figure 2B:
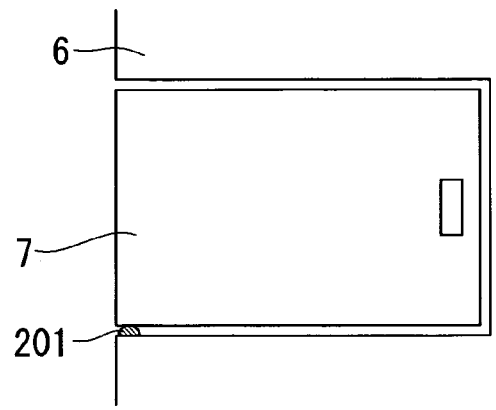

The access door 7 has a micro switch 201 for detecting whether the access door 7 is open or closed. In FIG. 2A, the access door 7 is at a closed position, whereas in FIG. 2B, the access door 7 is at an open position.

The micro switch 201 is urged upward with a spring. When the access door 7 is not disposed above the micro switch 201 (FIG. 2C), the micro switch 201 projects outward from a hole provided in the exterior case 6, turning the micro switch 201 off. When the access door 7 gradually closes and comes into contact with the micro switch 201, the micro switch 201 is pushed into the exterior case 6 by the pressing force receive thereby. When the access door 7 is closed further and reaches a predetermined position, the micro switch 201 is turned on. The closed and open positions of the access door 7 are detected through the on and off states of the micro switch 201.

Figure 2C:
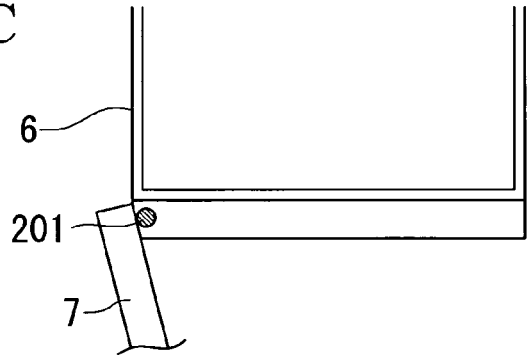
Figure 2D:
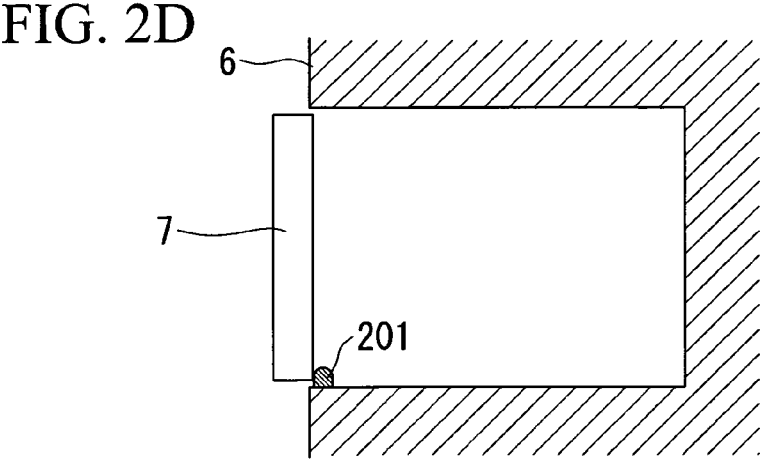

The micro switch 201 is adjusted such that the access door 7 has to be opened by almost 90°, as shown in FIG. 2C, unlike FIG. 2A where the access door 7 is only slightly open, to be detected as being open. The micro switch 201 and the XY stage 8 are electrically connected so that a switch ON/OFF signal is transmitted to the stage controller 3 via the XY stage 8.

Figure 3A:
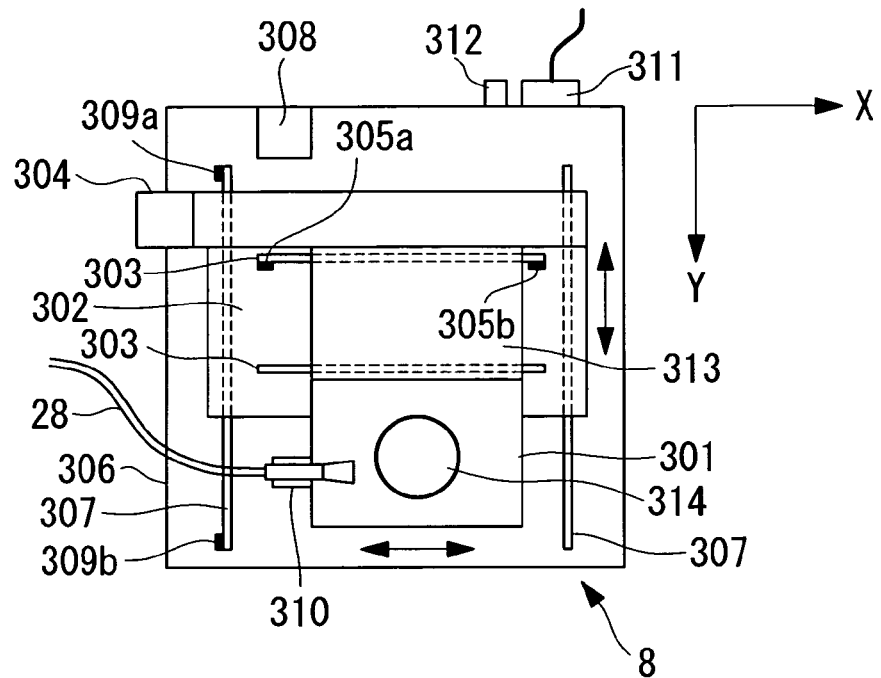
FIG. 3A illustrates the structure of an XY stage of the examination apparatus illustrated in FIG. 1.
Figure 3B:
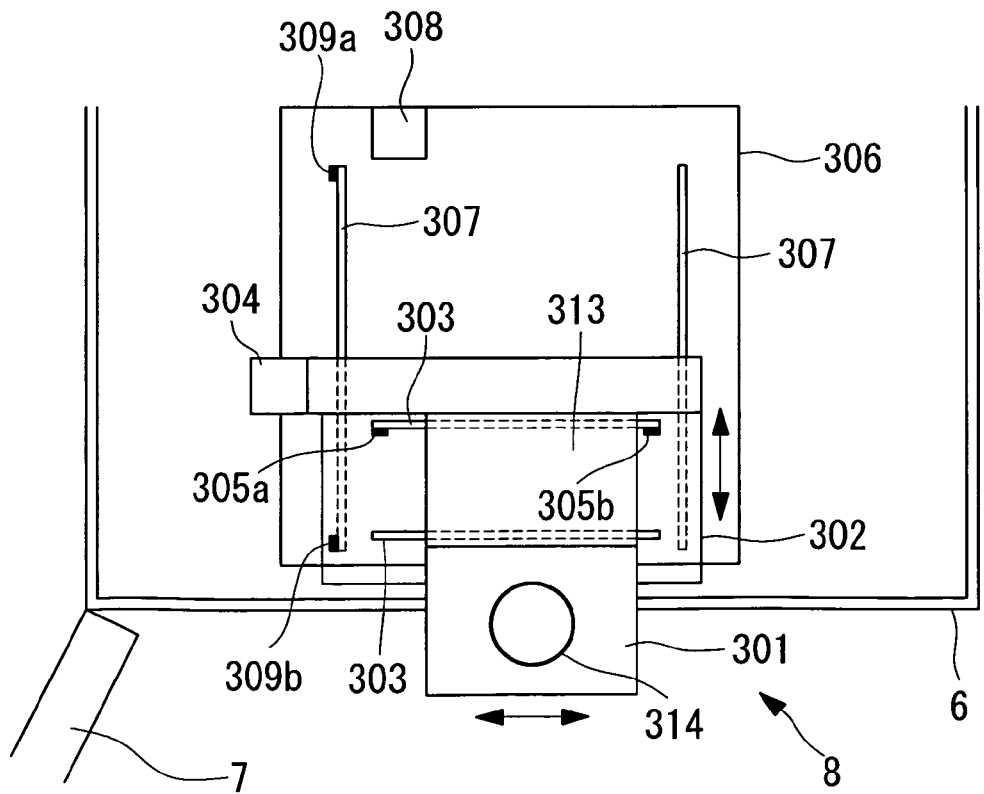
FIG. 3B illustrates the XY stage at an eject position.

FIGS. 3A and 3B illustrate details of the XY stage 8.

FIG. 3A illustrates the XY stage 8 positioned near the origin in the Y direction. FIG. 3B illustrates the XY stage 8 being moved to a position forward of that illustrated in FIG. 3A (i.e., moved in the positive Y direction). In this embodiment, an electrically operated XY stage is provided above a focusing unit (not shown in the drawing).

The XY stage 8 is moved in the X direction (i.e., front and back direction when the examination apparatus is viewed from the front) by moving a stage plate 301 on which a specimen is disposed along rails 303 mounted on a base 302.

A stage supporting plate 313 is disposed on the rails 303. The stage plate 301 is screwed onto the stage supporting plate 313.

To actually move the XY stage 8, a standard ball screw mechanism (not shown in the drawings) is used to drive the XY stage 8 with an X-axis motor 304. The movement range in the X direction is controlled by limit sensors 305a and 305b. The movement in the negative X direction in the drawing is limited by the limit sensor 305a, whereas the movement in the positive X direction is limited by the limit sensor 305b. A circular region 314 having the same dimensions as the outline of the examination field when the objective lens 14 having the lowest magnifying power is located in the optical path is marked on the stage plate 301. The center of the circular region 314 is aligned with the center of the examination field obtained when the XY stage 8 is moved to a home position, which is described below.

The XY stage 8 is moved in the Y direction (i.e., left and right direction when the examination apparatus is viewed from the front) by moving the entire assembly on the base 302 along rails 307 mounted on a base 306. To actually move the XY stage 8, similar to the movement in the X direction, a standard ball screw mechanism (not shown in the drawings) is used to drive the XY stage 8 with a Y-axis motor 308.

For the movement range in the Y direction, the movement in the negative Y direction in the drawing is limited by the limit sensor 309a, whereas the movement in the positive Y direction is limited by the limit sensor 309b. The limit sensors 305a, 305b, 309a, and 309b are photo interrupter sensors and detect the limits in corresponding directions by means of sensor blocking plates (not shown in the drawings) disposed on the stage plate 301 and the base 302.

The detection outputs from the limit sensors 305a, 305b, 309a, and 309b are sent to the stage controller 3. When any one of the limit sensors 305a, 305b, 309a, and 309b is turned on, movement in the direction corresponding to the turned on limit sensor is stopped. A control connector 311 and a switch input connector 312 are provided as interfaces with external equipment and are connected to the stage controller 3 and the micro switch 201, respectively, for data transmission.

A fixing unit 310 for fixing a first end of the anesthetic tube 28 used to anesthetize the specimen 11 is disposed on the stage plate 301. In this way, anesthetic gas sent from the anesthetic apparatus 10 can be supplied to the XY stage 8. The anesthetic tube 28 fixed by the fixing unit 310 is wound around a wind-up mechanism, described below, and a second end of the anesthetic tube 28 is connected to the anesthetic apparatus 10.

FIG. 3B illustrates the XY stage 8 being positioned at the limit position in the positive Y direction (i.e., a state in which the limit sensor 309a is turned on). As shown in the drawing, the stage plate 301 is mounted in such a way that it can be moved to a position that is outside the opening of the access door 7 when the access door 7 is opened.

Figure 4:
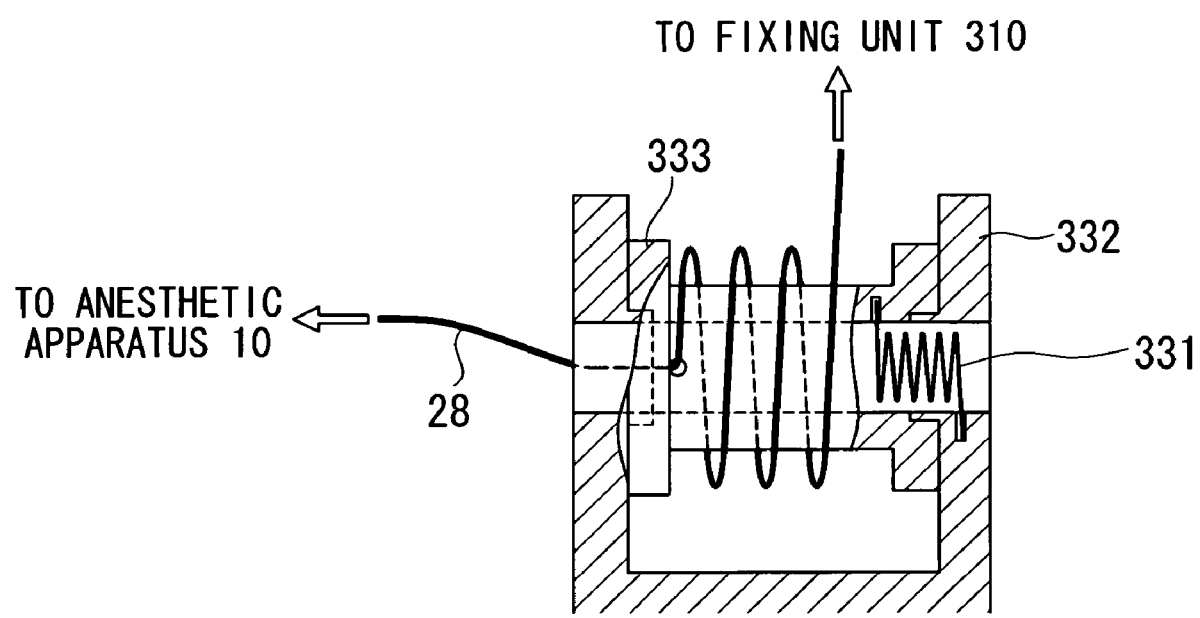
FIG. 4 illustrates the structure of a wind-up mechanism near the XY stage of the examination apparatus illustrated in FIG. 1.

FIG. 4 illustrates the wind-up mechanism of the anesthetic tube 28.

A bobbin-shaped reel 333 is rotatably attached to a fixed end 332 inside the examination apparatus main body 1. The rotary shaft of the reel 333 is hollow, and the anesthetic tube 28 is passed through the rotary shaft toward the anesthetic apparatus 10.

One end of a spring 331 is fixed to the fixed end 332, and the other end of the spring 331 is fixed to the reel 333. In this state, by rotating the reel 333 with respect to the fixed end 332, a repulsive force caused by the spring is applied in the direction opposite to the rotation. By winding the anesthetic tube 28 around the reel 333 at a position where repulsive force of the spring is not applied, when the anesthetic tube 28 is pulled out in the direction of the fixing unit 310, a force equivalent to force applied when pulling out the anesthetic tube 28 is applied to the reel 333. In this way, tension is constantly applied to the section of the anesthetic tube 28 between the fixing unit 310 and the wind-up mechanism, preventing the anesthetic tube 28 from becoming slack.

The anesthetic tube 28 wound around the reel 333 when the fixing unit 310 is moved closest to the wind-up mechanism, within the movement range of the XY stage 8, has a length that is sufficient even when the XY stage 8 is pulled out to a position where the distance between the fixing unit 310 and the wind-up mechanism is at the maximum extent within the movement range of the XY stage 8.

Figures 5A, 5B:
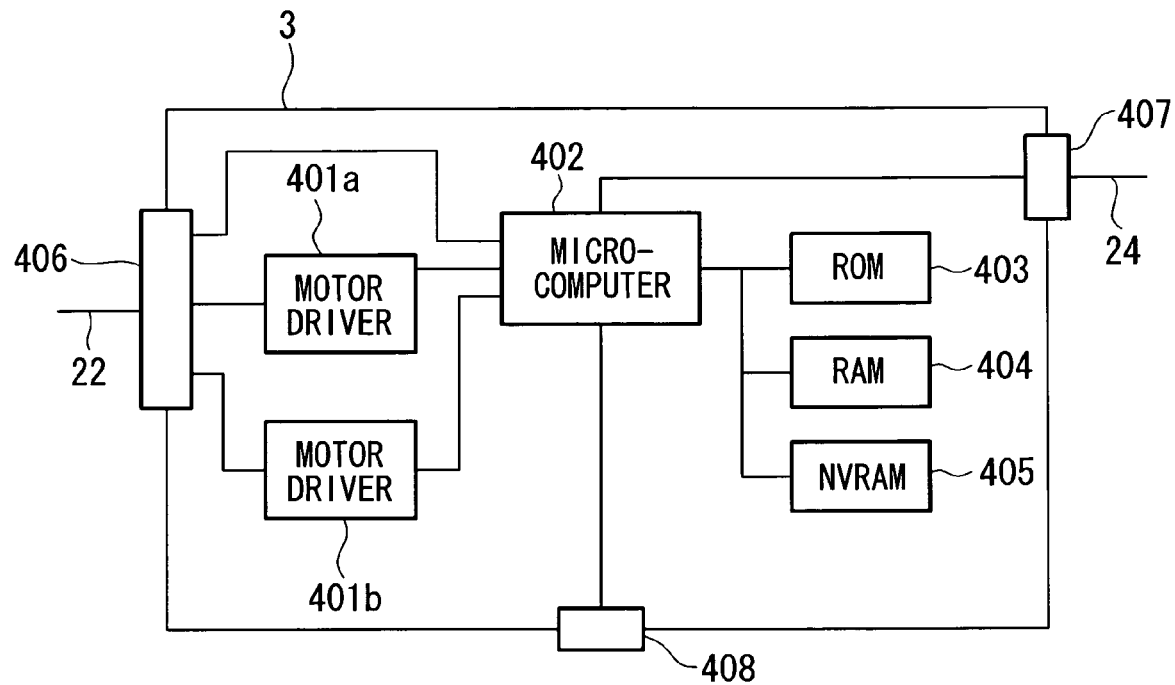
FIG. 5A illustrates the overall structure of a stage controller of the examination apparatus illustrated in FIG. 1.
FIG. 5B illustrates parameters corresponding to the movement range of the XY stage.

FIG. 5A illustrates the structure of the stage controller 3.

As shown in the drawing, motor drivers 401a and 401b for driving an X-axis motor and a Y-axis motor of the XY stage 8 are connected to a microcomputer 402. A ROM 403 for storing programs for operating the microcomputer 402, a RAM 404 used as a work area when a program is executed, and an NVRAM 405 for saving values such as drive parameters while the power is turned off are connected to the microcomputer 402.

A stage connector 406 is provided as an interface for the XY stage 8. The motor driver 401a for the X-axis motor and the motor driver 401b for the Y-axis motor are connected to the stage connector 406. Also, the microcomputer 402 is connected to the stage connector 406 to receive sensor signals from sensors disposed on the XY stage 8.

The microcomputer 402 manages the stage position coordinates and limits the movement range of the XY stage 8 by storing movement-restricting coordinates in the ROM 403 or the NVRAM 405 of the stage controller 3. In this way, the movement range of the XY stage 8 may be limited according to whether the access door 7 is open or closed.

As shown in FIG. 5B, when the access door 7 is open, coordinates corresponding to the entire movement range of the XY stage 8 are set. When the access door 7 is closed, a movement range that prevents the XY stage 8 from coming into contact with the closed access door 7 is defined by coordinates.

An RS232C connector 407 is provided as an interface for connecting the computer 5, such as a personal computer, to the microcomputer 402. The RS232C connector 407 enables the microcomputer 402 is capable of communicating with the computer 5 via the RS232C cable 24 so as to receive information on the motor control for the X and Y axes and the coordinates. An HS connector 408 is connected to an operating unit 30 for operating the XY stage 8.

FIG. 6 illustrates a GUI of a control application for the examination apparatus main body 1 displayed on a screen of the computer 5.

A live image display screen 801 constantly displays the examination image captured by the digital camera 9. Magnification switching buttons 802a to 802e correspond to the objective lenses 14 and are used to select one of the objective lenses 14 that has a specific magnifying power and that is to be disposed in the optical path. Examination-method switching buttons 803a to 803c correspond to the cubes 13 and are used to select which examination method (e.g., bright-field examination or fluorescence examination (for fluorescence examination, a dye is selected)) is to be employed for examining the specimen 11.

Focus buttons 806a and 806b correspond to the movement of the XY stage 8 in the upward and downward direction (i.e., Z direction) and is used to focus the examination image.

Stage operating buttons 804a to 804h are used to move the XY stage 8 in eight different directions within a plane parallel to the surface of the XY stage 8. An eject/return (E/R) button 805 is used to move the XY stage 8 to predetermined positions. When the E/R button 805 is operated, the XY stage 8 is ejected from the examination position to a position where the specimen 11 can be easily changed, a new specimen 11 can be easily disposed, or an intravenous injection can be easily carried out on the specimen 11, or the XY stage 8 is returned to the examination position.

The eject and return processes are carried out alternately each time the E/R button 805 is operated. When the XY stage 8 is at the eject position, the return process is carried out when the E/R button 805 is operated, whereas when the XY stage 8 is at the examination position, the eject process is carried out when the E/R button 805 is operated. When the return process is carried out, the XY stage 8 is returned to one of two different positions: the position of the XY stage 8 where the eject command was received (full return process); and the position of the XY stage 8 where a predetermined area of the XY stage 8 is positioned at the center of the examination field (hereinafter, this position is referred to as a "home position," and this operation is referred to as a "home return process"). The commands for a full return process and a home return process are distinguished by clicking the E/R button 805 once or clicking the E/R button 805 twice within a predetermined amount of time (i.e., double-clicking).

Fine/coarse movement switching buttons 807 and 808 are disposed near the focus buttons 806*a* and 806*b* and the stage operating buttons 804*a* to 804*h*. The fine/coarse movement switching button 807 is used to change the movement speed of the XY stage 8 in the Z direction and is used to switch between a coarse movement mode and a fine movement mode. The fine/coarse movement switching button 808 is used to change the movement speed of the XY stage 8 in the XY directions.

Next, the operation of the examination apparatus according to this embodiment, having the above-described structure, will be described with reference to the flow chart in FIG. 7.

Figure 7:
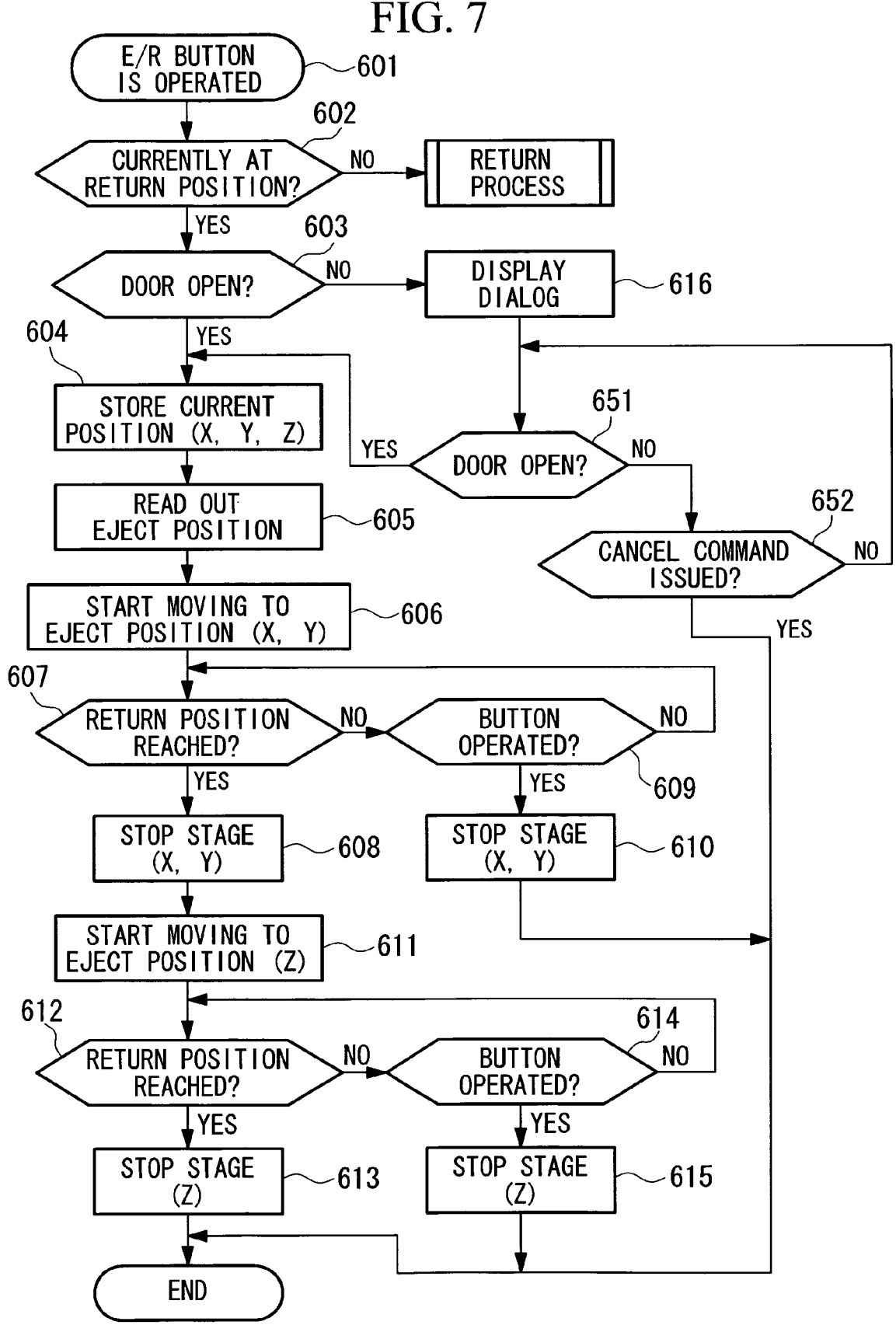
FIG. 7 is a flow chart showing the operation of the main components of the examination apparatus illustrated in FIG. 1.

When the E/R button 805 on the application GUI is clicked in Step 601 in FIG. 7, in Step 602, it is determined whether or not the XY stage 8 is currently at a return position (examination position). Here, when it is determined that the XY stage 8 is at the return position, the eject process is started. When it is determined that the XY stage 8 is not at the return position, the return process is started (refer to FIG. 8).

In Step 603, it is determined whether or not the access door 7 is open on the basis of the on or off state of the micro switch 201. When it determined that the access door 7 is open, in Step 604, the coordinates for the current position of the XY stage 8 are stored in a storage device (e.g., hard disk or memory) in the computer 5. Here, the XY coordinates are obtained from the stage controller 3 and the Z coordinate is obtained from the system controller 2. Next, in Step 605, the coordinates (X, Y, Z) corresponding to a predetermined eject position are read out.

The coordinates for the eject position are stored in the storage device of the computer 5. When the access door 7 is not open, in Step 616, a dialog instructing the user to open the access door 7 so that the XY stage 8 can be ejected is displayed. When the user opens the access door 7 at this point ("yes", in Step 651), the process proceeds to Step 604 to continue the eject process.

When the user does not open the access door 7 and issues a cancel command ("yes", in Step 652), the process is terminated without carrying out the eject movement.

In Step 606, the XY stage 8 is moved in the XY directions toward the eject position. While the XY stage 8 is moving, in Step 607, the XY stage 8 is constantly checked to determine whether or not it has reached the eject position. In Step 609, when a button on the application GUI is operated, in Step 610, the movement of the XY stage 8 is stopped, and the eject process is aborted.

When the XY stage 8 reaches the eject position in Step 607, the movement of the XY stage 8 is stopped in Step 608, and the eject movement in the XY directions is completed. Next, the eject movement in the Z direction is carried out. In Step 611, the XY stage 8 is moved in the Z direction on the basis of a command sent via the system controller 2. Similar to the eject movement in the XY directions, while the XY stage 8 is moving, in Step 612, the XY stage 8 is constantly checked to determine whether or not it has reached the eject position.

In Step 614, when a button on the application GUI is operated, in Step 615, the movement of the XY stage 8 in the Z direction is stopped, and the eject process is aborted. When the XY stage 8 reaches the eject position in Step 612, the movement of the XY stage 8 in the Z direction is stopped in Step 613, and the eject process in the Z direction is completed. This completes the entire eject process.

Only when the entire eject process is completed, is the current condition of the XY stage 8 (i.e., return or eject position of the XY stage 8) changed to "ejected state." In other words, when the eject process is aborted in Step 609 or 614 by operating a button, the current stage condition will remain in "return state," which is the condition the XY stage 8 was in when the eject process was started.

Next, the return process will be described with reference to FIG. 8.

In Step 621, it is determined whether or not the E/R button 805 was double-clicked in Step 601. When it is determined that the E/R button 805 was double-clicked, in Step 622, the predetermined home position coordinates (stored in the storage device of the computer 5) are read out. Here, the read-out X and Y coordinates are the coordinates for the predetermined home position, and the Z coordinate is the coordinate for an eject position stored when the XY stage 8 was last ejected.

In Step 621, when it is determined that the E/R button 805 was not double-clicked (i.e., the E/R button 805 was clicked only once), in Step 623, the stored coordinates (X, Y, Z) for the position of the XY stage 8 at the point when the eject process is instructed are read out.

Next, in Step 624, the XY stage 8 is moved toward the return position in the Z direction. While the XY stage 8 is moving, in Step 625, the XY stage 8 is constantly checked to determine whether or not it has reached the return position in the same manner as in the eject process. When a button on the application GUI is operated in Step 627, the movement of the XY stage 8 in the Z direction is stopped in Step 628, and the return process is aborted. In Step 625, when the XY stage 8 reaches the return position, the movement of the XY stage 8 in the Z direction is stopped in Step 626, and the return movement in the Z direction is completed.

Next, the return movement in the XY directions will be described.

In Step 629, the XY stage 8 is moved in the XY directions toward the return position. In the same way as in the eject process, while the XY stage 8 is moving, in Step 630, the XY stage 8 is constantly checked to determine whether or not it has reached the return position. When a button on the application GUI is operated in Step 632, the movement of the XY stage 8 in the XY directions is stopped in Step 633, and the return process is aborted.

In Step 630, when the XY stage 8 reaches the return position, the movement of the XY stage 8 in the XY directions is stopped in Step 631, and the return movement in the XY directions is completed. In this way, the entire return process is completed. Only when the entire return process is completed, the current condition of the XY stage 8 (i.e., return or eject position of the XY stage 8) is changed to the "return state." In other words, when the return process is aborted by operating a button in Step 627 or 632, the current stage condition will remain in the "ejected state," which is the condition the XY stage 8 was in when the return process was started.

In the examination apparatus according to the first embodiment, the specimen 11 is disposed in a sealed space and is examined from the outside. Access to the specimen 11 is limited by the access door 7. The movement range of the XY stage 8 on which the specimen 11 is disposed is extended outside the opening of the access door 7 when the access door 7 is open. Whether the access door 7 is open or closed is detected to automatically move the XY stage 8 outside through the opening. In this way, the user can easily change the specimen 11, dispose a new specimen, and treat the specimen 11. Since the XY stage 8 can be quickly returned to the examination position, various different specimens can be examined quickly and easily.

According to this embodiment, the access door 7 limiting access to the specimen 11 is a door that can be pulled open. However, the access door 7 may be a shutter that is slid open. In the above, the access door 7 is a door that opens from the left side. However, the same advantages are achieved regardless of the direction (left, right, up, or down) from which the access door 7 is opened.

In the above, the eject position is a predetermined fixed position. Instead, however, the eject position may be changed. This is possible by modifying the return process in FIG. 8 to the process shown in FIG. 9.

Figure 8:
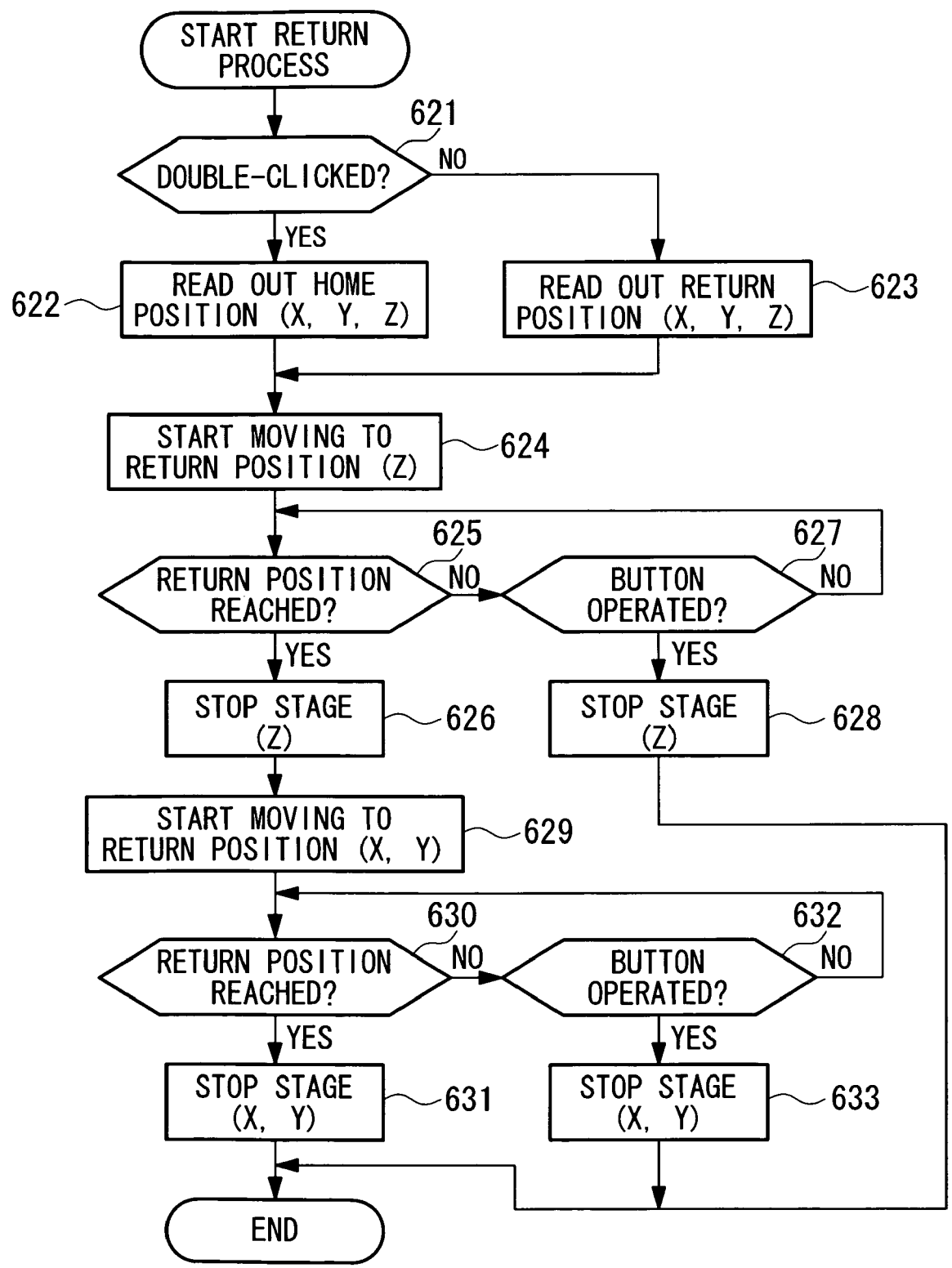
FIG. 8 is a flow chart showing the operation of the main components of the examination apparatus illustrated in FIG. 1.
Figure 9:
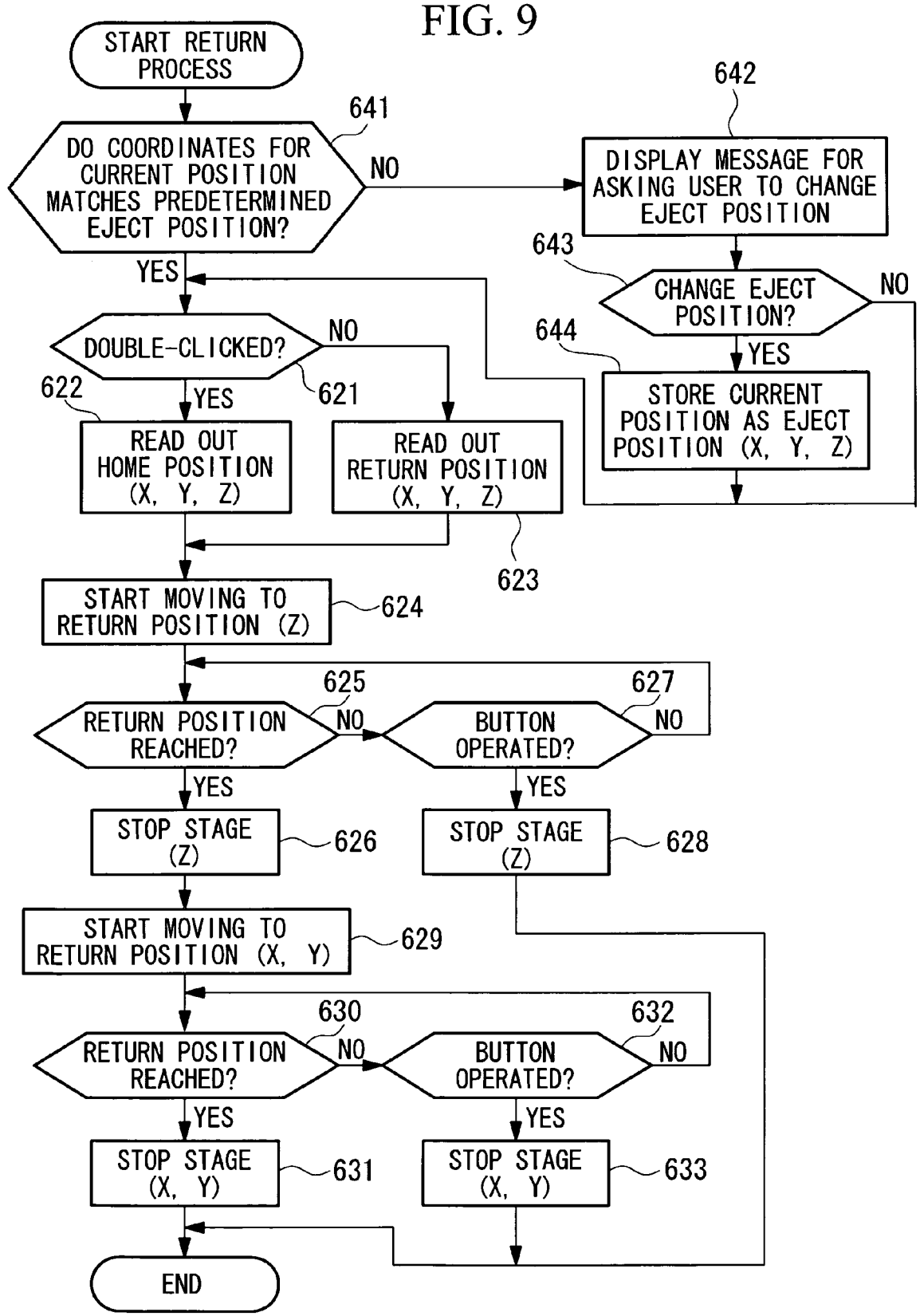
FIG. 9 is a flow chart showing the operation of the main components of a first modification of the examination apparatus illustrated in FIG. 1.

The steps in the process shown in FIG. 9 that are the same as those in FIG. 8 are indicated by the same reference numbers, and descriptions thereof are not repeated. When the E/R button 805 is operated to start the return process, in Step 641, it is determined whether or not the coordinates (X, Y, Z) for the current position of the XY stage 8 match the coordinates for the predetermined eject position. In other words, it is determined whether the user has already executed the eject process and the XY stage 8 has been moved from the eject position. Here, when it is determined that the current position and the predetermined eject position match, the process proceeds to Step 621, and the subsequent steps are carried out in the same manner as the steps in FIG. 8.

In Step 641, when it is determined that the current position does not match the predetermined eject position, in Step 642, a message is displayed to ask the user to decide whether or not to set the current position as the eject position. In Step 643, when the user decides not to set the current position as the eject position, the process proceeds to Step 621. When the user decides to set the current position as the eject position, the process proceeds to Step 644 so as to store the coordinates (X, Y, Z) for the current position as coordinates for the eject position. The subsequent steps are the same as those in FIG. 8, and descriptions thereof are not repeated.

According to this embodiment, the eject and return positions are set three-dimensionally. However, the XY stage 8 may be moved two-dimensionally, and the eject and return positions may be set two-dimensionally. The XY stage 8 can be moved two-dimensionally and the eject and return positions can be set two-dimensionally by carrying out the same process as in FIGS. 7 and 8, except for the steps related to the movement in the Z direction (which are Steps 611 to 615 in FIG. 7 and Steps 624 to 628 in FIG. 8).

When the eject and return positions are set two-dimensionally, the XY stage 8 can be operated through the operating unit 30 connected to the stage controller 3. In this way, the same advantages as described above are achieved without using an application GUI of the computer 5.

Figure 10:
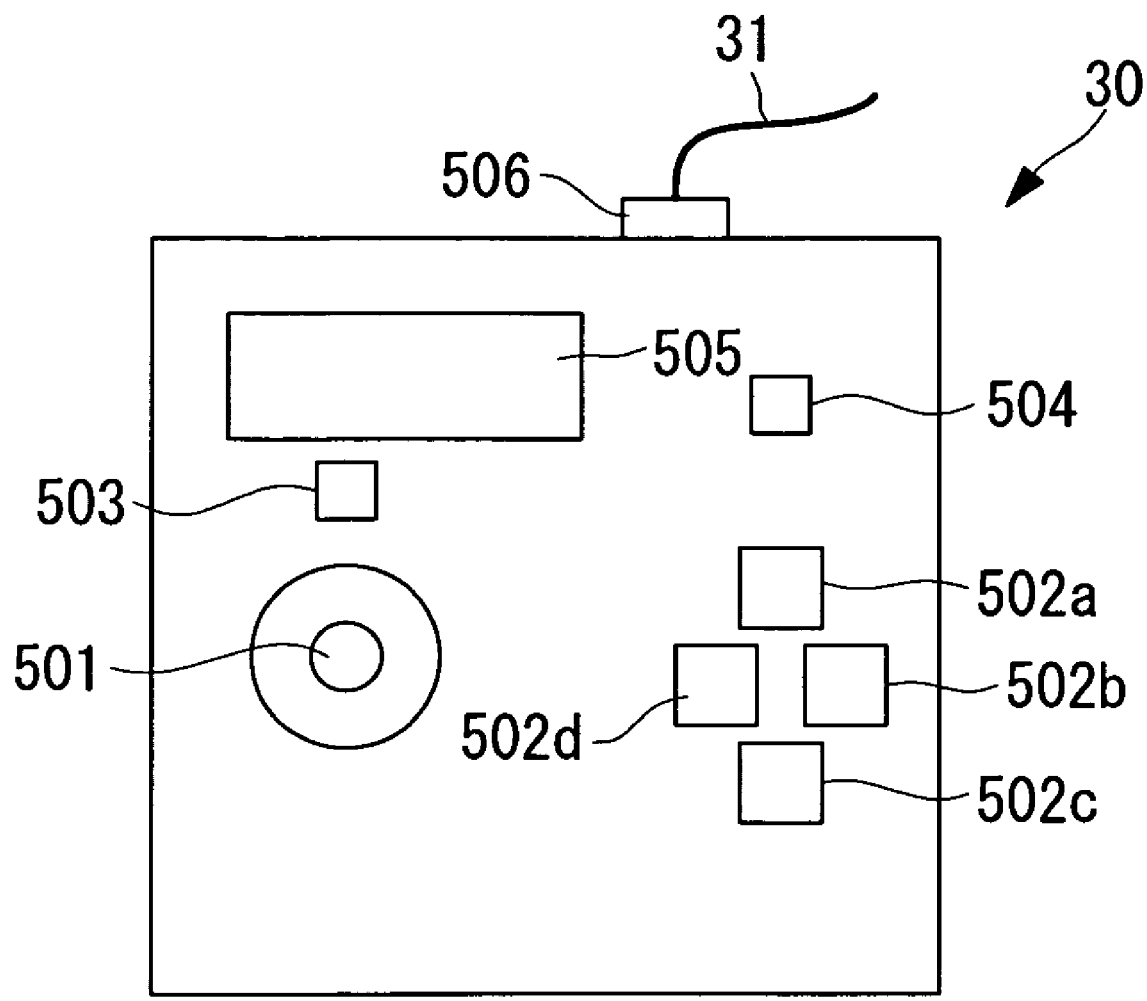
FIG. 10 illustrates an operating unit of the examination apparatus illustrated in FIG. 1.

FIG. 10 illustrates the structure of the operating unit 30.

A joystick 501 and directional keys 502a, 502b, 502c, and 502d are used to move the XY stage 8 in the X and Y directions. When the joystick 501 is used for operation, the speed of the stage movement can be changed in accordance with the tilt of the stick. The larger the tilt of the joystick 501 is with respect to its vertical position, the greater the speed of the stage movement is. When the XY stage 8 is operated with the directional keys 502a, 502b, 502c, and 502d, the speed of the stage movement is constant.

A fine/coarse movement switching button 503 switches the speed of the stage movement (i.e., switches between a coarse movement mode and a fine movement mode) controlled by the joystick 501 and the directional keys 502a, 502b, 502c, and 502d. In the coarse movement mode, the speed of the stage movement is, for example, ten times greater than the speed of the stage movement in the fine movement mode. An E/R button 504 has the same configuration as the E/R button 805 on the application GUI. A display unit 505 displays information on the coordinates of the XY stage 8, the speed of the XY stage 8, and the movement (i.e., return movement or eject movement) being carried out. A connector 506 is connected to the stage controller 3 via a cable 31.

By employing the above-described structure and using the following modifications in the processes shown in FIGS. 7 and 8, return and eject processes can be carried out with the operating unit 30.

1. In Step 604, the destination for storing the current position is the RAM 404 or the NVRAM 405 in the stage controller 3.

2. In Steps 605, 622, and 623, the position coordinates are read out from the RAM 404 or the NVRAM 405 in the stage controller 3.

3. In Step 616, the dialog display is changed to a dialog displayed on the display unit 505 of the operating unit 30 or a warning sound.

4. In Steps 609 and 632, instead of operating the buttons on the application GUI, buttons or a joystick on the operating unit 30 are operated.

The E/R button 504 may be disposed not only on the operating unit 30 but also on the XY stage 8 or inside the examination apparatus main body 1 near the XY stage 8.

According to this embodiment, the speed of the XY stage 8 during the return and eject processes is constant. However, the return and eject movements may be carried out at any speed selected by the user by sending a command from the computer 5 via the RS232 cable 24 and storing information on the selected speed in the NVRAM 405 of the stage controller 3.

According to this embodiment, the return position of the XY stage 8, i.e., the home position or the position of the XY stage 8 immediately before eject was carried out, is distinguished by double-clicking or single-clicking the E/R button 805. Instead, however, a home eject button may be added so that when the E/R button 805 is operated, the XY stage 8 returns to the position immediately before ejected and when the home return button is operated, the XY stage 8 returns to the home position.

Figure 11:
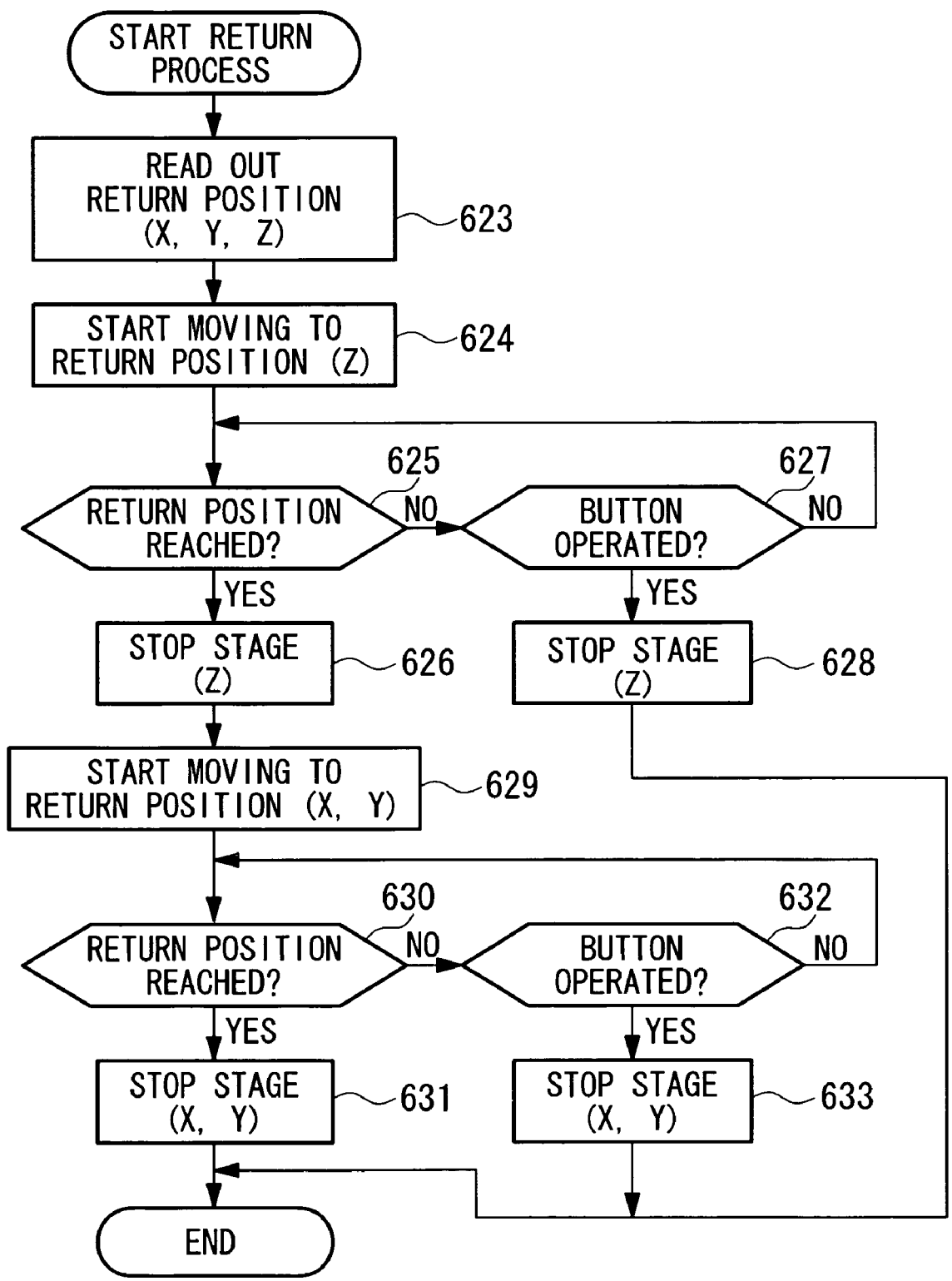
FIG. 11 is a flow chart showing the operation of the main components of a second modification of the examination apparatus illustrated in FIG. 1.

The return process carried out when the E/R button 805 is operated is shown in FIG. 11. This process is the same as that shown in FIG. 8, except that Steps 621 and 622 are not included. Since the steps included in this process have already been described above, descriptions thereof are not repeated. The process carried out when the home return button is operated is the same as that shown in FIG. 11, except that Step 623 is replaced by Step 622 in FIG. 8.

According to this embodiment, the open or closed state of the access door 7 is detected by the micro switch 201. Instead, however, the open or closed state of the access door 7 may be detected using a detection unit such as a magnetic sensor or an optical sensor.

According to this embodiment, the circular region 314 having the same shape as the outline of the examination field of the objective lens 14 having the lowest magnifying power is marked on the stage plate 301. By marking the outlines of the examination fields of the other objective lenses 14 concentrically with the circular region 314, the specimen 11 can be disposed even more easily.

According to this embodiment, the communication interfaces between the computer 5 and the system controller 2, the stage controller 3, and the illumination device 4 conform to a specific standard. These communication interfaces may conform to well-known communication standards, such as IEEE1394, USB, RS232C, Ethernet, and standards for wireless LAN.

In this embodiment, a process may be added so that when a command for terminating the control application of the computer 5 is issued, the current condition of the XY stage 8 is determined. Then, when the XY stage 8 is at the eject position, the return process is automatically started, and after the return process is completed, the control application is terminated. This process is the same as that shown in FIG. 7, except that Step 601 is changed to a step in which the termination of the application is instructed, and Steps 603 to 616 are omitted. In FIG. 8, Step 621 is changed to "display selected dialog?" The subsequent steps are the same. The application is terminated only when the complete return process is carried out.

Figure 17:
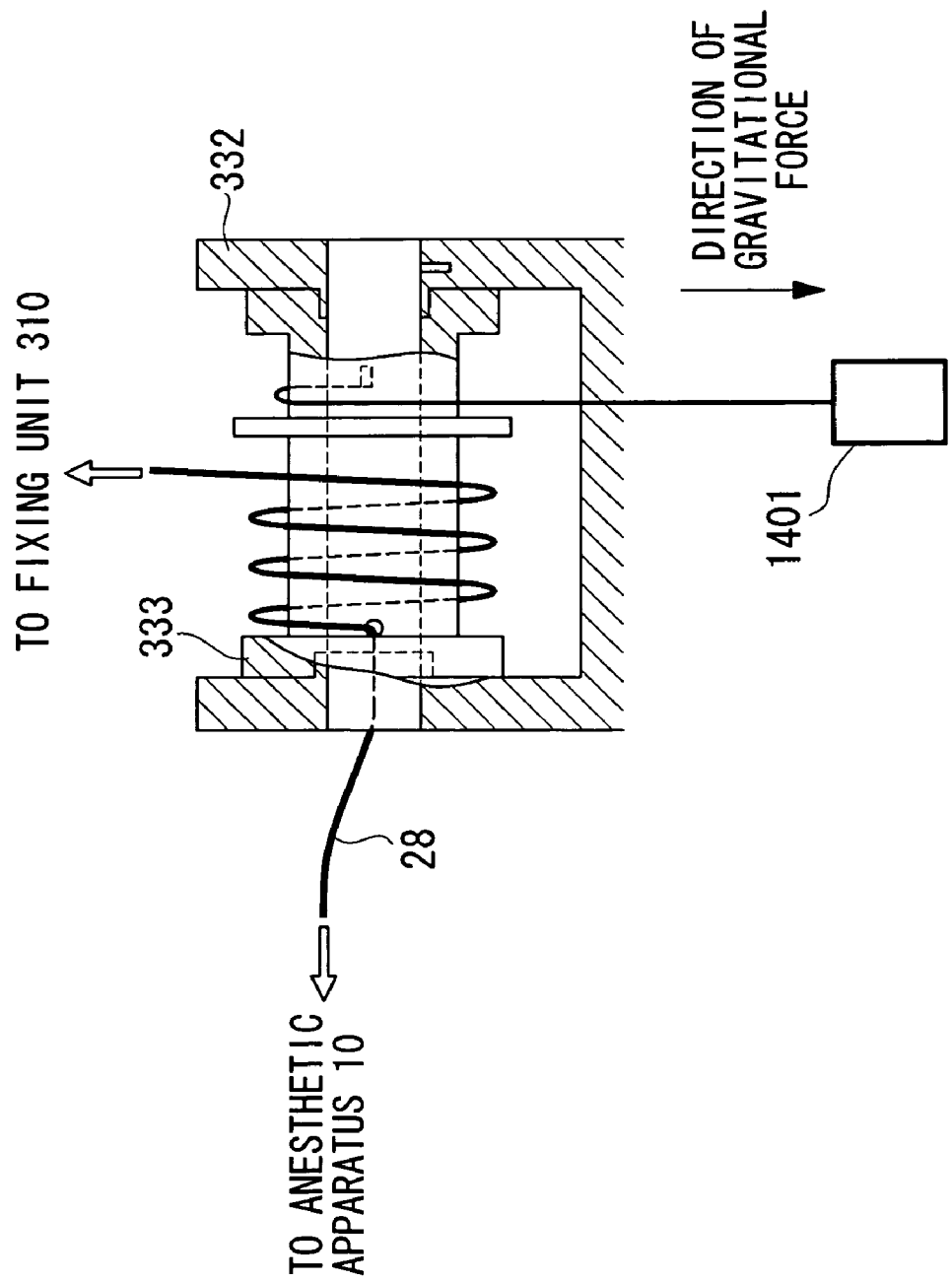
FIG. 17 illustrates a modification of the wind-up mechanism of the examination apparatus illustrated in FIG. 1.
Figure 18A:
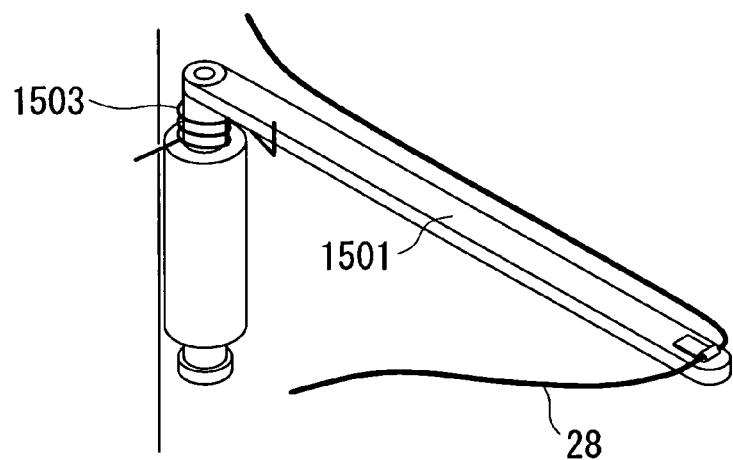
FIGS. 18A to 18C illustrate another modification of the wind-up mechanism of the examination apparatus illustrated in FIG. 1.
Figure 18B:
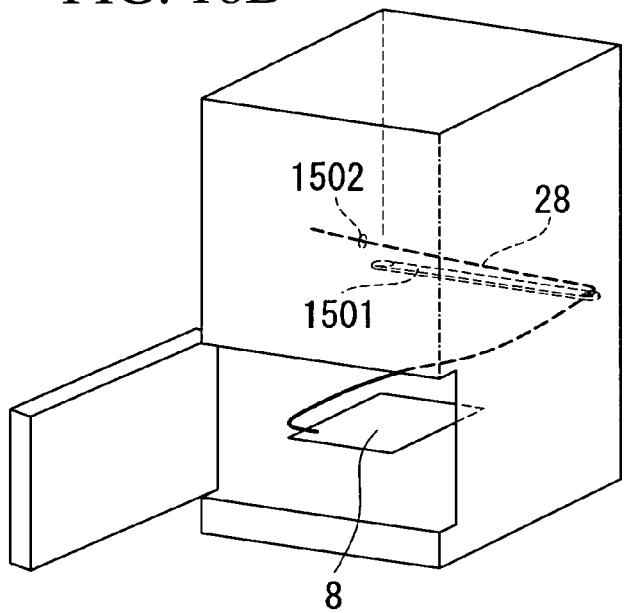
Figure 18C:
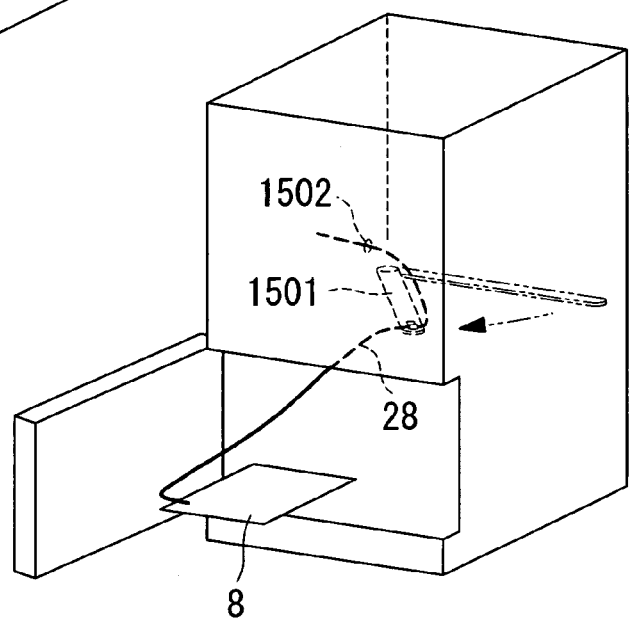

According to this embodiment, the mechanism for preventing the anesthetic tube 28 from slacking is a wind-up mechanism including the spring 331. Instead, however, as shown in FIG. 17, a wind-up mechanism including a weight 1401 may be employed. Moreover, as shown in FIGS. 18A to 18C, a mechanism for constantly pulling the anesthetic tube 28 includes a rod 1501 with a known torsion coil spring 1503. This mechanism has a through-hole 1502 formed in the chassis.

An examination apparatus according to a second embodiment of the present invention will be described below with reference to FIGS. 12A to 16.

The examination apparatus according to this embodiment has the same structure as the examination apparatus according to the first embodiment (FIG. 1), except that a small window for changing the specimen 11 is provided in the access door 7. The stage plate 301 is projected through this small window to enable a user to change the specimen 11.

In the second embodiment, the components that are the same as those according to the first embodiment are represented by the same reference numerals, and descriptions thereof are not repeated.

Figure 12A:
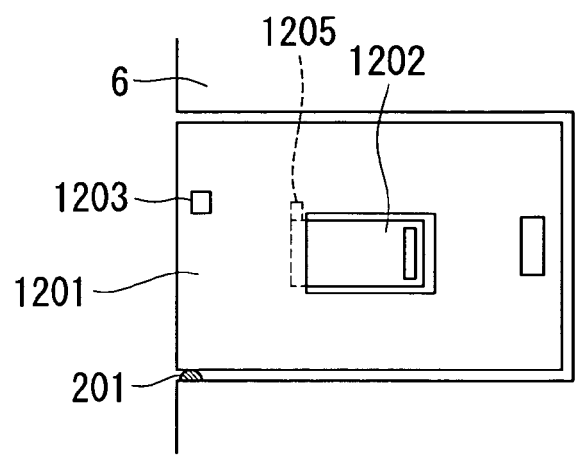
FIGS. 12A to 12D illustrate a sliding window and the area therearound in an examination apparatus according to a second embodiment of the present invention.
Figure 12C:
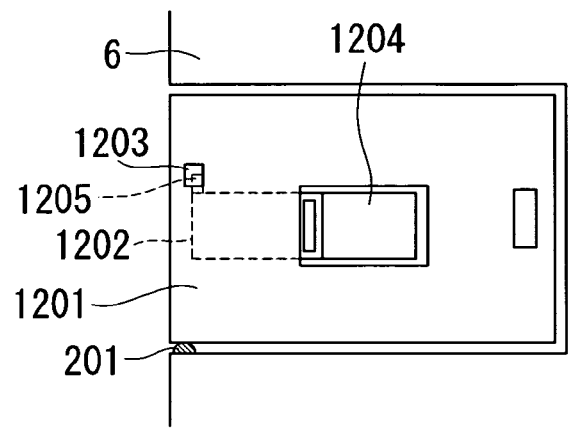

FIGS. 12A and 12C illustrate an access door 1201 included in the examination apparatus according to this embodiment and the area around the access door 1201. Near the center of the access door 1201, a sliding window 1202 slidable in the horizontal direction is provided. When the sliding window 1202 is slid toward the left in the drawings, a sliding opening 1204 is formed to allow access to the inside of the examination apparatus main body 1.

Near the sliding window 1202, a photo interrupter 1203 for detecting the open or closed state of the sliding window 1202 is provided. When the sliding window 1202 is slid to the left by a predetermined amount, a light-blocking plate 1205 attached to the sliding window 1202 blocks the light incident on the photo interrupter 1203. The width of the sliding opening 1204 that enables light incident on the photo interrupter 1203 to be blocked is sufficiently greater than the total width of the stage plate 301 and the fixing unit 310 on the XY stage 8.

Figure 12B:
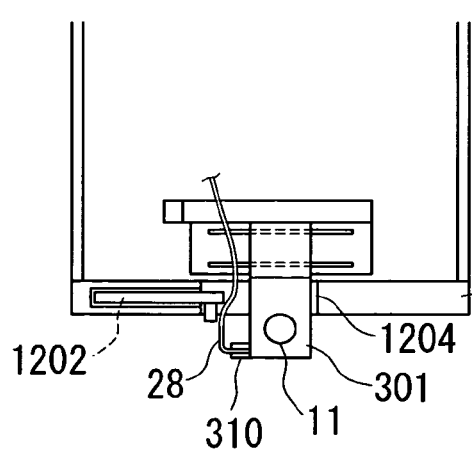
Figure 12D:
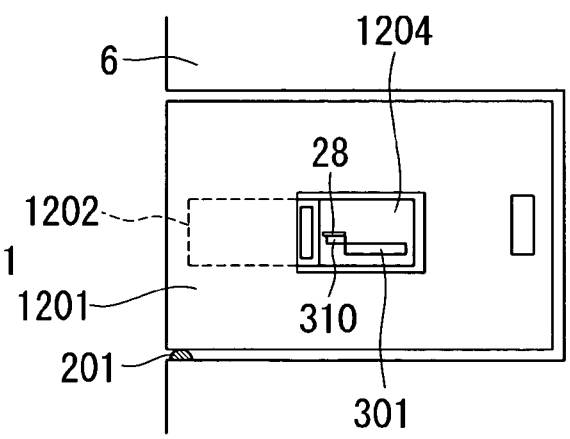

FIGS. 12B and 12D illustrate the stage plate 301 of the XY stage 8 being projected outside from the sliding opening 1204. The position of the XY stage 8 in the vertical direction is set to a height so that the lower surface of the stage plate 301 does not come into contact with the lower edge of the sliding opening 1204, for example, 5 mm upward. In this way, even when the specimen 11 disposed on the stage plate 301 is thick, the specimen 11 will not come into contact with an edge of the sliding opening 1204.

Figure 13:
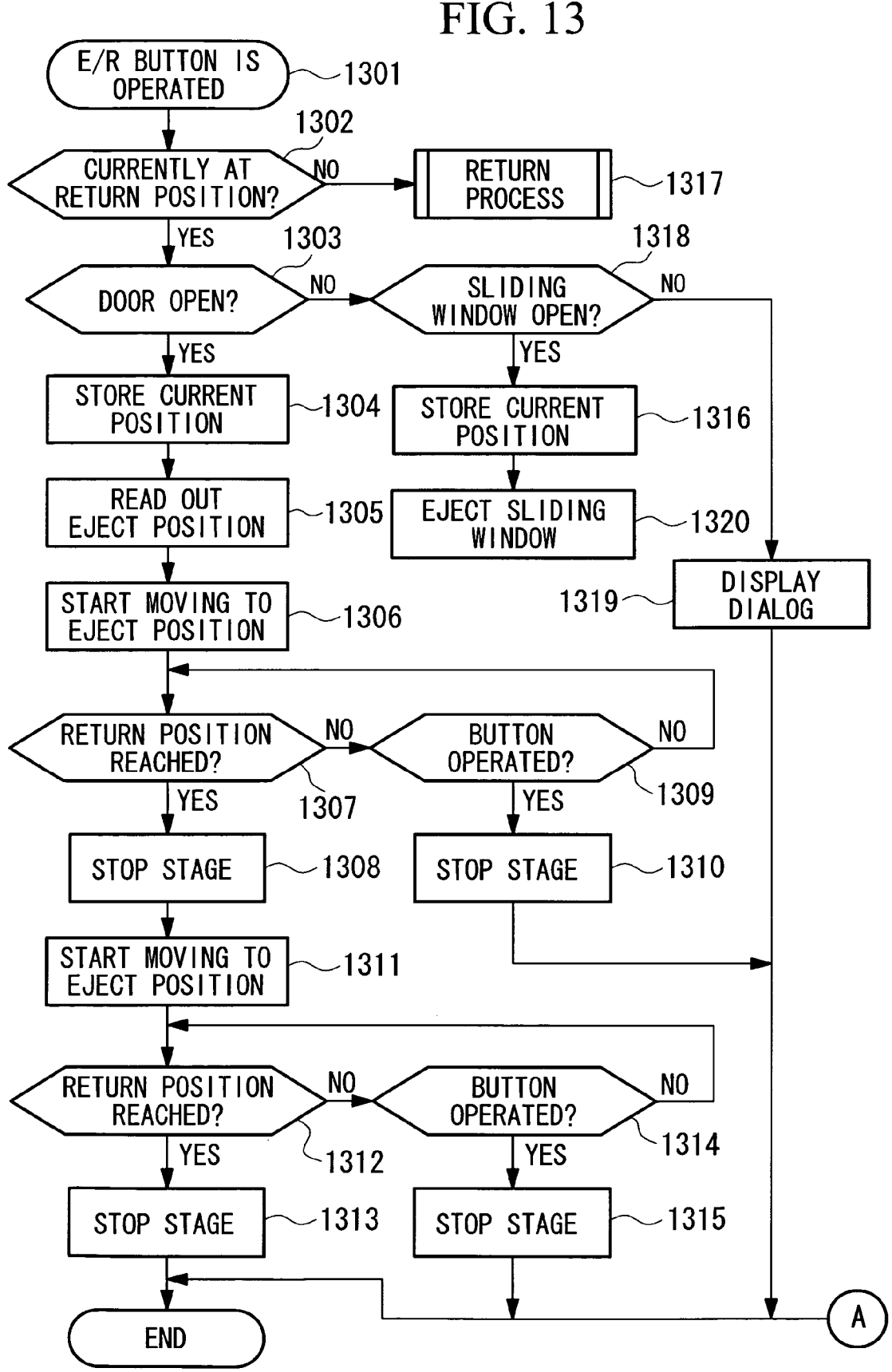
FIG. 13 is a flow chart showing the operation of the main components of the examination apparatus illustrated in FIGS. 12A to 12D.
Figure 14:
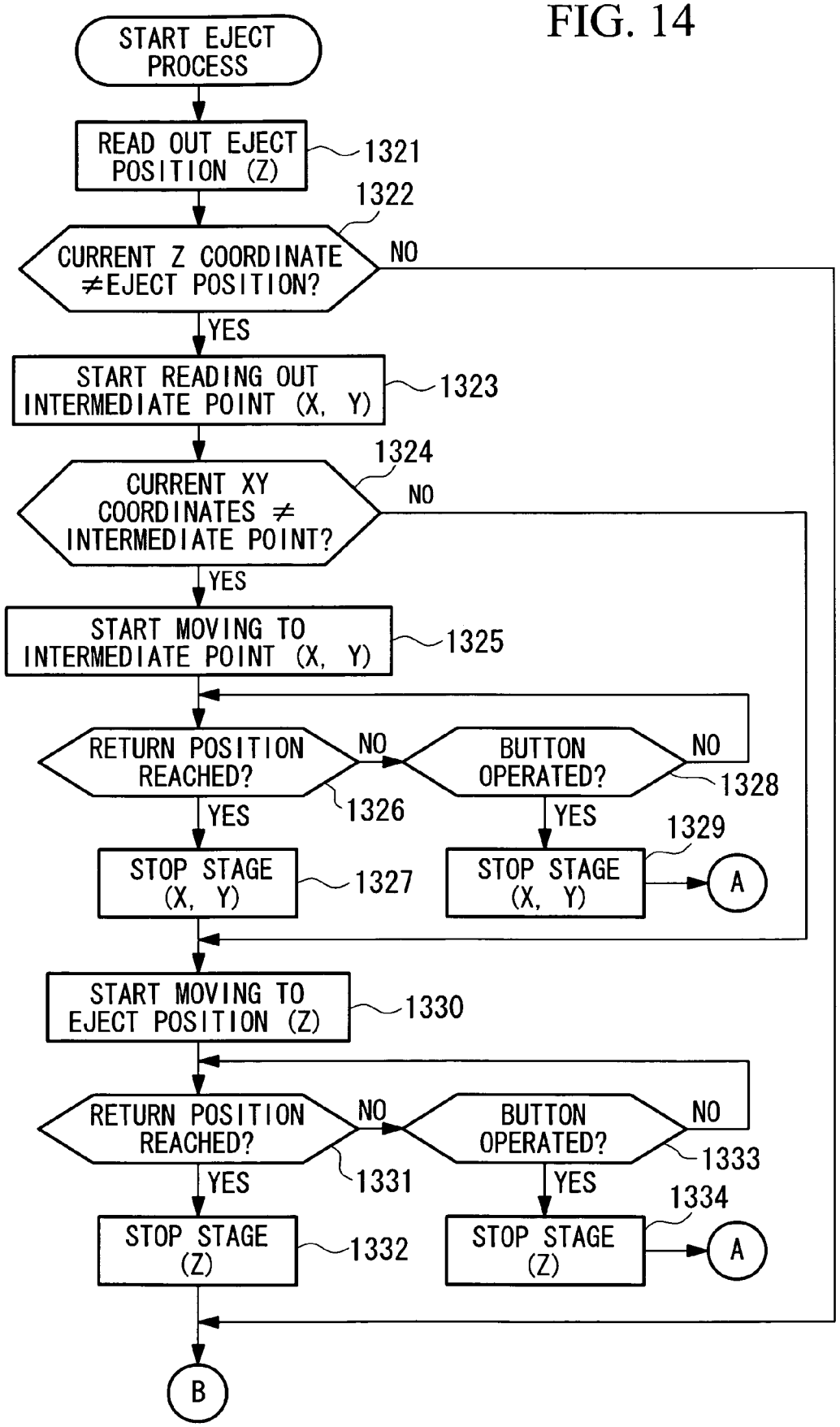
FIG. 14 is a flow chart showing the eject process using the sliding window in the examination apparatus illustrated in FIGS. 12A to 12D.

Next, the operation of the examination apparatus according to this embodiment will be described with reference to the flow chart in FIG. 13.

In Step 1301, when the E/R button 805 is operated, in Step 1302, it is determined whether the current position of the XY stage 8 is the return position (examination position). Here, when it is determined that the XY stage 8 is at the return position, the eject process is started. When it is determined that the XY stage 8 is not at the return position, the return process is started in Step 1317 (refer to FIG. 16).

In Step 1303, it is determined whether or not the access door 1201 is open on the basis of the on or off state of the micro switch 201 provided near the access door 1201. When it is determined that the access door 1201 is open, the eject process starts in Step 1304. Since Steps 1304 to 1315 of the eject process are the same as Steps 604 to 615 shown in FIG. 7, descriptions thereof are not repeated.

The process returns to Step 1303. When the access door 1201 is not open, in Step 1318, it is determined whether or not the sliding window 1202 is open. When it is determined that the sliding window 1202 is not open, in Step 1319, a dialog indicating that the eject process cannot be carried out because the access door and the sliding window are closed is displayed. Then, the eject process is completed. On the other hand, when it is determined that the sliding window 1202 is open, coordinates (X, Y, Z) for the current position of the XY stage 8 are stored in the storage device (Step 1316), and the eject process using the sliding window 1202 is started (Step 1320, FIGS. 14 and 15).

The eject process using the sliding window 1202 is to move the stage plate 301 of the XY stage 8 in a manner such that the stage plate 301 protrudes out from the opening that is formed by opening the sliding window 1202.

Figure 15:
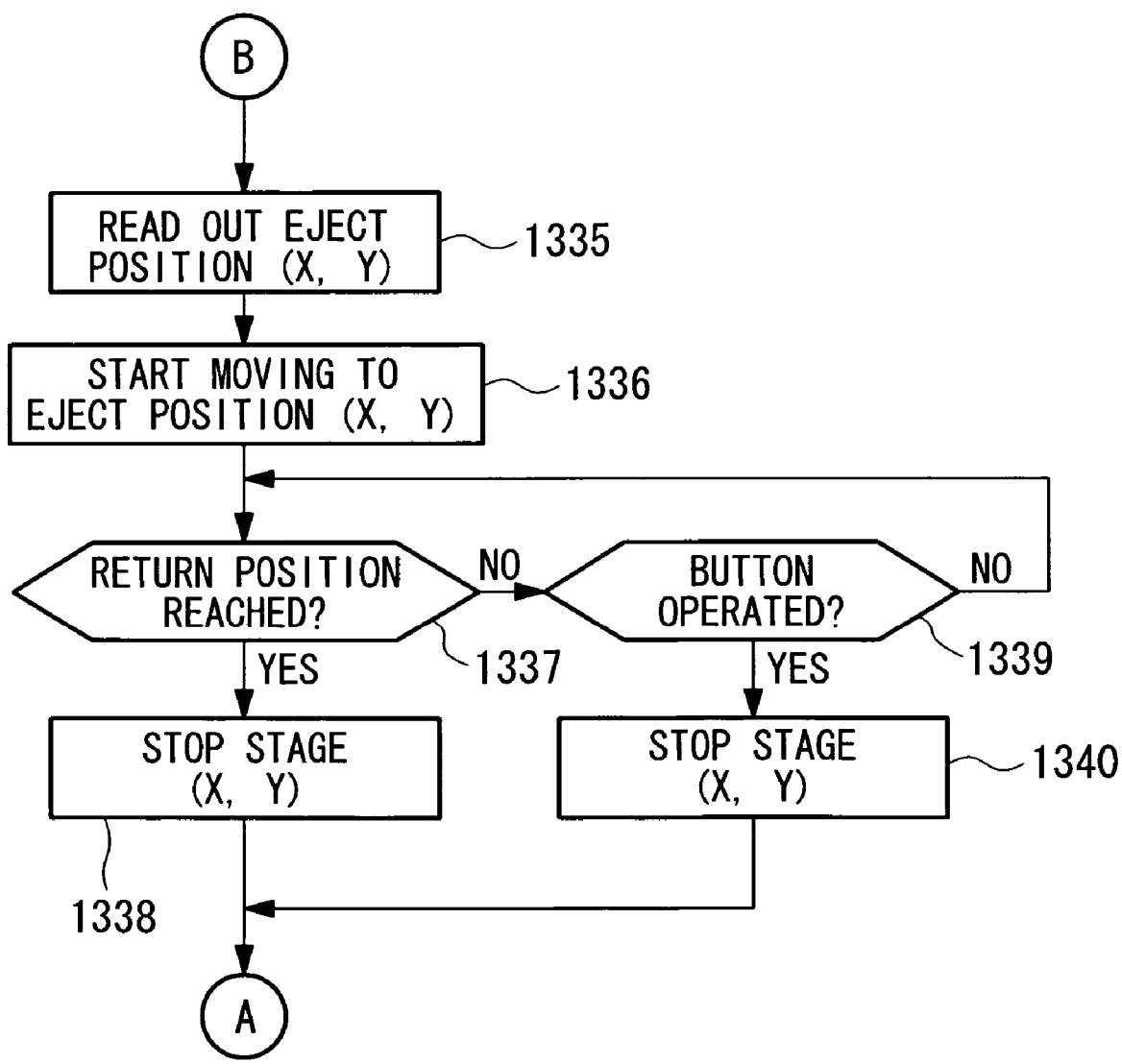
FIG. 15 is a flow chart continuing from the flow chart in FIG. 14.

As shown in FIG. 15, first, the Z coordinate of the eject position is read out, and it is determined whether or not the current Z coordinate matches the read-out Z coordinate (Steps 1321 and 1322). Here, when it is determined that both Z coordinates match, the process proceeds to Step 1335.

On the other hand, when it is determined that the Z coordinates do not match, in Step 1323, the XY coordinates of an intermediate point are read out. The intermediate point is a point substantially in the middle of a first point corresponding to XY coordinates (Y coordinate in particular) of the stage plate 301 when the stage plate 301 is disposed directly below the objective lens 14, i.e., when the stage plate 301 is in the optical axis of the objective lens 14, and a second point corresponding to XY coordinates (Y coordinate in particular) of the stage plate 301 when the stage plate 301 is moved in the Y direction to a position near the access door 1201 but not in contact with the access door 1201. When the stage plate 313 is at the second point, the stage supporting plate 313 is disposed directly below the objective lens 14 and the stage plate 301 is not disposed orthogonal to the objective lens 14.

In Step 1324, it is determined whether or not the read-out XY coordinates and the coordinates for the intermediate point match. When it is determined that both coordinates match, the process proceeds to Step 1330.

On the other hand, when it is determined that the coordinates do not match, in Step 1325, the stage plate 301 of the XY stage 8 starts moving in the XY directions toward the intermediate point.

When the XY stage 8 starts moving toward the intermediate point, in Step 1326, the XY stage 8 is constantly checked to determine whether or not it has reached the intermediate point. In Step 1328, when a button on the application GUI is operated, in Step 1329, the XY stage 8 is stopped, and the eject process is aborted (proceed to A in FIG. 13). In Step 1326, when the XY stage 8 reaches the intermediate point, in Step 1327, the XY stage 8 is stopped, and the movement of the XY stage 8 to the intermediate point is complete.

Next, the eject movement in the Z direction is carried out. In Step 1330, a command is sent through the system controller 2 to start moving the XY stage 8 in the Z direction. While the XY stage 8 is moving, in Step 1331, the XY stage 8 is constantly checked to determine whether or not it has reached the eject position. In Step 1333, when a button on the application GUI is operated, in Step 1334, the movement of the XY stage 8 in the Z direction is stopped, and the eject process is aborted (proceed to A in FIG. 13). When the XY stage 8 reaches the eject position in Step 1331, the movement of the XY stage 8 in the Z direction is stopped in Step 1332, and the eject process in the Z direction is completed.

Next, as shown in FIG. 15, the eject movement in the XY directions is carried out. In Step 1335, the XY coordinates of the eject position are read out, and the XY stage 8 is moved (Step 1336).

While the XY stage 8 is moving, in Step 1337, the XY stage 8 is constantly checked to determine whether or not it has reached the eject position. In Step 1339, when a button on the application GUI is operated, in Step 1340, the movement of the XY stage 8 in the Z direction is stopped, and the eject process is aborted (proceed to A in FIG. 13). When the XY stage 8 reaches the eject position in Step 1337, the movement of the XY stage 8 in the Z direction is stopped in Step 1338, and the eject movement in the Z direction is completed.

The above-described steps complete the eject process. When the eject process is completed (i.e., the process is completed after carrying out Step 1338), the current state of the XY stage 8 (i.e., disposed at the return or eject position) is changed to the "ejected state." In other words, when the eject process is aborted because of a button being operated in Step 1339, 1328, or 1333, the current state of the XY stage 8 remains in the "return state," in which the XY stage 8 is at the position where it was when the eject process was started.

Figure 16:
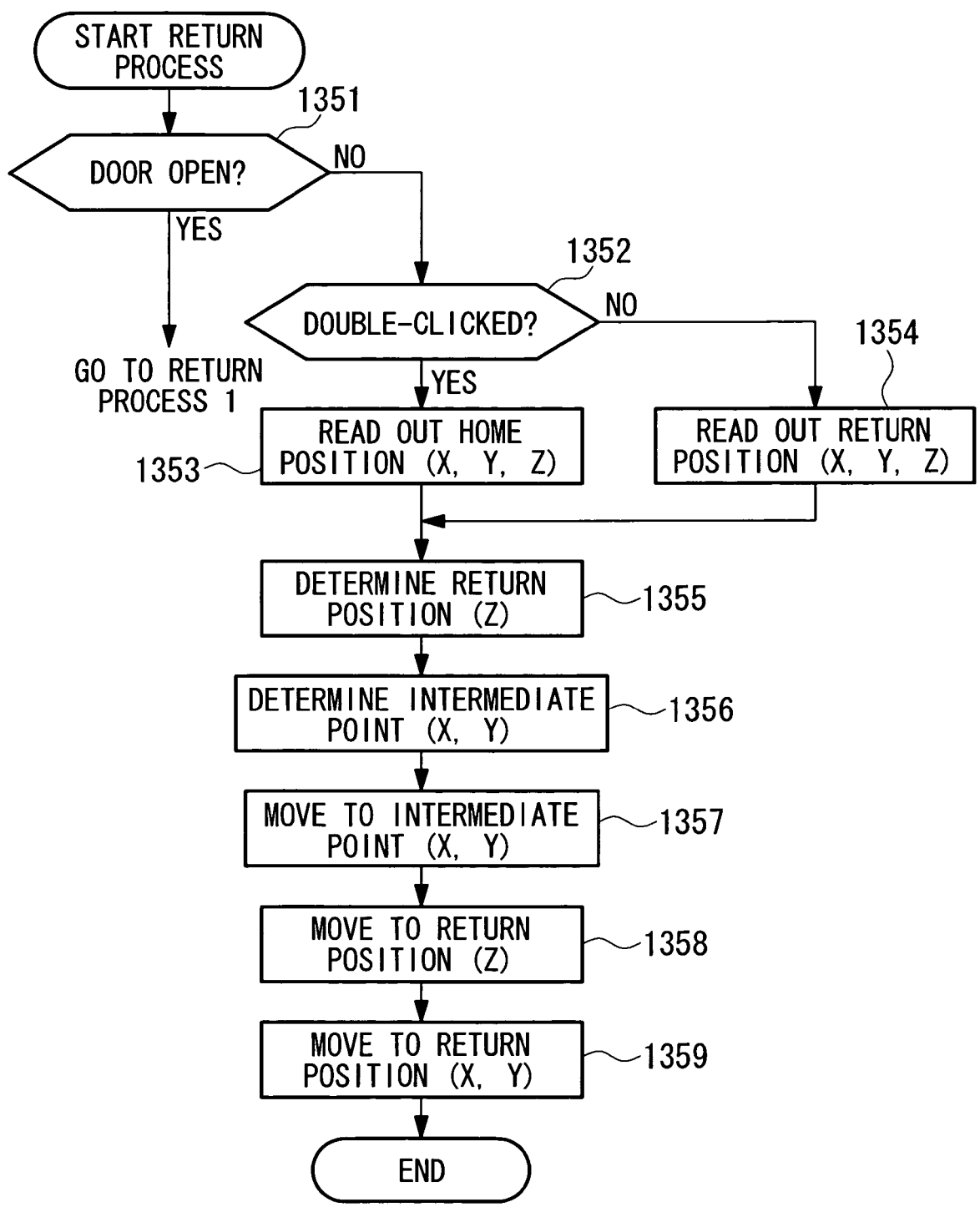
FIG. 16 is a flow chart showing the return process using the sliding window in the examination apparatus illustrated in FIGS. 12A to 12D.

The return process will be described with reference to FIG. 16.

In Step 1351, it is determined whether or not the access door 1201 is open. When it is determined that the access door 1201 is open, the return process according to the first embodiment shown in FIG. 8 is carried out. When it is determined that the access door 1201 is not open, the process proceeds to Step 1352, and it is determined whether or not the E/R button 805 was double-clicked in Step 1301. When it is determined that the E/R button 805 was double-clicked, the coordinates for a predetermined home position are read out from the storage device of the computer 5 in Step 1353. However, at this time, the X and Y coordinates of the read-out coordinates are the coordinates for the predetermined home position, and the Z coordinate is the coordinate for the value stored the last time the eject process was carried out.

In Step 1352, when it is determined that the E/R button 805 was not double-clicked (i.e., clicked only once), in Step 1354, the coordinates (X, Y, Z) for the position of the XY stage 8 stored when a command for carrying out the eject process was received are read out. Since the subsequent steps are the same as the steps in the eject process using the sliding window shown in FIG. 13 except that "eject" is changed to "return", detailed descriptions of these steps are not repeated. The return position determination in Step 1355 corresponds to Steps 1322; the intermediate point determination in Step 1356 corresponds to Steps 1323 and 1324; moving the intermediate point in Step 1357 corresponds to Steps 1325 to 1329; moving the return position in Step 1358 corresponds to Steps 1330 to 1334; and moving the return position in Step 1359 corresponds to Steps 1336 to 1340.

According to the second embodiment of the present invention, an opening that allows the specimen 11 to be changed is formed in the access door 1201 that is provided to limit access to the inside of the examination apparatus having the same configuration as that according to the first embodiment. Since the stage plate 301 on which the specimen 11 is disposed can be automatically moved in and out through the opening, the specimen 11 can be changed easily, and, moreover, the specimen 11 can be treated easily.

What is claimed is:

1. An examination apparatus comprising:
   a stage on which a specimen is to be disposed;
   an optical system configured to form an enlarged or reduced image of the specimen;
   a cover configured to separate an inside from an outside and to cover the stage and the optical system in the inside;
   an opening and closing member provided as part of the cover;
   a detection unit configured to detect whether the opening and closing member is in a closed state or an open state;
   a stage driving unit configured to move the stage such that only when the detection unit detects the opening and closing member is open, the stage is moved by the stage driving unit from the inside to the outside of the cover through an opening covered by the opening and closing member;
   an anesthetic apparatus configured to anesthetize the specimen;
   a tube configured to supply anesthetic from the anesthetic apparatus to the specimen;
   an attachment member configured to attach the tube to the stage; and
   a holding member configured to hold the tube interposed between the attachment member and the anesthetic apparatus,
   wherein the tube is easily held by the holding member even when the eject movement and the return movement of the stage is carried out, and
   wherein the holding member is a rotary wind-up mechanism.

* * * * *